3,053,764
METHOD AND COMPOSITION OF MATTER FOR SEALING OPENINGS IN WELL HOLES
Fred E. Hummel, P.O. Box 1608, Ventura, Calif., and Philip L. Christianson, Rte. 3, Box 16B, Ojai, Calif.
No Drawing. Filed Apr. 20, 1956, Ser. No. 579,450
6 Claims. (Cl. 252—8.5)

This invention generally relates to well drilling operations, and more particularly to a method and composition for sealing off openings and closing pores in the bottom and side walls of well hole formations in order to prevent and counteract draining away of drilling fluid and subsequent loss of circulation.

In conventional rotary drilling operations, it is common practice to use a drilling fluid or mud which is pumped under pressure into the well through the drill pipe and thereafter circulated upwardly between the drill pipe and well side walls. Under certain pressure conditions, the drilling fluid has a tendency to escape into the earth formations through which the bore hole passes. This loss of fluid is commonly known as "lost circulation" and frequently develops in porous sand formations, cracked formations, cavernous formations, and other types of strata characterized by crevices, channels or similar types of openings through which drilling fluid may seep and flow.

In the past, a variety of materials and re-agents have been added to the drilling fluid in an effort to overcome the problem of lost circulation. One method which has been generally used is to introduce fibrous or flaky materials, primarily of an organic nature, into the drilling fluid as it is being circulated through the well. In this approach, many different specific materials have been used including, for example, cotton seed hulls, feathers, sawdust, wood shavings, moss, and the like. Such materials, however, have not proved to be successful for the purpose of sealing off the porous formations since they have a tendency to deteriorate under the high drilling fluid pressures and for the same reason to decrease in volume and become slimy so as to "worm" into the formation openings without actually forming an effective seal. Also, these materials have a tendency to partially plug porous zones at the periphery of the well bore surface and are thus subject to being scraped off by the drill bit during removal and replacing of the bit. The same problem is encountered when setting protective casing.

Another approach in combating lost circulation has been to use cement either alone or in combination with certain of the heretofore mentioned bulk materials, or in some instances in combination with volcanic ash, gels, and other similar substances. The cement, itself, however, presents problems since it will oftentimes separate out of the slurry form in which it is deposited in the well. Thus, the cement particles will by their heavier weight have a tendency to separate away from the water and become dehydrated before the sealing off operation is completed. Even in compositions where the cement has been mixed with other compositions to prevent premature dehydration, the cement oftentimes has the characteristic of passing into the crevices of the porous or cracked formation without actually effectively plugging the openings in the well hole side walls.

An additional problem in connection with compositions and materials which have conventionally been used as additives to drilling fluid to prevent lost circulation is the fact that such materials in many instance must be added gradually over an extended period of time in an endeavor to achieve the sealing off effect desired.

It is, therefore, an object of the present invention to provide a method and composition for preventing and counteracting lost circulation as a consequence of openings in the bottom and/or side walls of well holes enabling the rapid forming of an effective seal to effectively plug the formation openings.

Another object of the present invention is to provide a composition for closing off openings in well holes which may be readily introduced into drilling fluid in large amounts during a short interval of time, and which will remain firmly in place as the plugging action takes place to seal off the openings.

A still further object of the present invention is to provide a composition for preventing lost circulation through openings in well holes, which has a low specific gravity, which is inert with respect to all usual types of drilling fluid, which is relatively incompressible, and which is susceptible of being pumped in conventional drilling rig pumping systems without damage to or deterioration of the equipment.

A still further object is to provide a method of forming a composition for depositing in drilling fluid to seal off openings in well holes which is susceptible of being accomplished with economical processing equipment while still effective to result in a composition fulfilling the foregoing object.

These and other objects and advantages of the present invention are attained by depositing in the drilling fluid a substance comprised generally of small porous particles preferably of a coal-type of coke product, which are characterized by uniformly irregular surfaces and which have imbedded in their interstices a gel product or expandable material preferably in the nature of a high grade bentonite. The particles may be introduced directly into the drilling fluid or mud in large amounts without the necessity of first forming a slurry. In addition, the effectiveness and manners of the sealing action of the particles and imbedded bentonite or expandable material is such that rapid incorporation of the coke-like particles into the drilling fluid is possible without the necessity of gradually depositing the particles over an extended period of time, as is normally required with other types of compositions.

It has been found upon introduction of the coke-like particles into the drilling fluid that a swelling or expansion of the bentonite within the interstices begins as slow hydration occurs. The particles, because of their irregular surfaces, tend to form a bridge, and gradually lock in position upon swelling of the bentonite, to in turn, seal off the crevices and pores of the permeable formations through which the fluid has been draining from the well hole. This swelling action will continue for as much as twenty-four hours after the coke-like particles have bridged in place.

The coke-like particles, of themselves, because of their irregular surface characteristic tend to naturally intermesh and agglomerate and bridge the porous area. However, the actual sealing and locking action results as the bentonite absorbs water from the drilling fluid and begins to swell so as to enmesh and combine in an interlocking action with other particles in which a similar swelling action is occurring, whereby a solid seal is gradually built up. It has been found that complete hydration of the impregnated bentonite may take nearly twenty-four hours; however, the closing off of the permeable formation begins almost immediately after introduction of the coke particles into the lost circulation zone. These particles may be small, large or mixture of different sizes depending on the type of lost circulation encountered.

As the swelling or absorption of water occurs in the imbedded bentonite, the coke-like particles are gradually continuing to bridge and become locked in place, while still permitting a small amount of fluid to filter through where intermeshing is irregular. As this action occurs, more of the particles will tend to become locked in the meshed configuration of particles together with any other of the organic or fibrous lost circulation materials which may be introduced into the drilling fluid.

Coke has been found to be an advantageous substance for effecting the bridging action and also for acting as a carrier for the impregnated bentonite or other thixotropic substance employed. In addition, it is chemically inert in all types of drilling fluid, and is relatively incompressible while still being porous so as to allow the introduction of the bentonite into its interstices. It will be appreciated, nevertheless, that other materials having similar characteristics might be employed, and it has been found, for example, that clinker ash, expanded shale, and other comparable substances may be successfully used so long as they are characterized by a uniformly irregular surface to form the initial bridge. Although it is desirable for most applications to use relatively low specific gravity materials, such as the aforementioned substances, the specific gravity of the substance used may vary so long as it does not exceed the density of the particular drilling fluid.

It is similarly feasible to employ other types of chemicals, preferably having thixotropic properties, which have a tendency to expand upon the absorption of water in place of the bentonite as well as to use other conventional drilling fluid constituents in combination with the bentonite, which act to thin and emulsify the oil. For example, other members of the montmorillonite group of clays could be used in place of bentonite.

At the present time, four other chemical additives have been successfully used in practice in combination with the bentonite. Broadly, these additives are derived from one of four groups of chemicals characterized respectively by their ability to thin and defloculate, thicken and flocculate, emulsify oil, reduce fluid loss, and increase fluid loss. An example of the first of these is quebracho or similar tree bark extracts containing tannin or gallic acid, which have a tendency to thin the fluid and reduce its viscosity. A second substance which has been used is causticized lignite, also effective as a thinner and emulsifier. A third compound used in conjunction with bentonite has been carboxymethyl-cellulose for water loss control, and a fourth, deflocculating phosphates in various compounded forms.

In the preparation of this improved drilling fluid additive to prevent lost circulation, coke-like particles from coal or other similar predominantly carbon by-products of coal are screened and sized to a preferred uniformly irregular particle diameter of one-eighth inch to one-half inch. These limits are by no means restricting since very fine or very large particles may be desirable in certain applications. The coke-like particles are then mixed with a high grade, finely ground bentonite powder in the range of one to fifty percent by weight of the bentonite with respect to the weight of the coke. These limits are not similarly restricting since certain porous material can carry a greater percentage of expandible material. Under most lost circulation conditions it has been found desirable to use approximately fifty percent by weight of the bentonite to the weight of the coke particles, although it is feasible to use lower percentages and to still obtain satisfactory results.

After the coke particles and bentonite powder and other chemicals as heretofore discussed have been mixed in dry form, water is added to form a homogeneous mixture. In actual practice, this procedure may be accomplished by mixing the bentonite and coke in the dry form and placing the resultant composition on a screw conveyor passing beneath a water spray. Thus, a paste is formed and the resultant action is that the bentonite seeps into the pores and interstices of the coke-like particles. In certain circumstances, it may be desirable to force the bentonite into the pores under pressure.

Thereafter, the paste is heated to a temperature of at least 212° F. or higher in order to drive off the water and water of crystallization. A rotary kiln may be employed for this purpose and designed such that the heat radiated therefrom will impinge directly upon the composition products. As a consequence of this drying process, the coke-like particles will remain with the bentonite and/or chemicals, impregnated within, as well as encrusted around, their pores and interstices. Prior to the packaging of the dried particles, it is additionally desirable to size and screen the particles back to predetermined sizes so that no clinkers or oversized particles will remain in the composition, which might be detrimental to pumping equipment or detract from the sealing effectiveness of the composition. This sizing and screening may be accomplished by using pressurized air to blow the dried particles through a given mesh screen.

The effectiveness of this new method and composition for sealing off openings in well bore holes in order to prevent lost circulation has recently been demonstrated in the case of a well located on the Grubb lease of the San Miguelito Oil Field, Ventura, California. At Grubb 564, after trying to regain circulation with all types of lost circulation material and cementing at 7500 feet for twelve days, the addition of 1500 pounds of the composition of this invention, immediately regained returns. On two succeeding levels at 8500 ft. and 10,000 ft. when lost circulation zones were again encountered, the addition of this composition regained circulation with the first application of 5000 pounds in each case. Since the demonstration of the effectiveness of the composition of this invention on Grubb 564, all lost circulation has been combated successfully on the Grubb lease in the Miguelito Oil Fields, Ventura, California, by this means.

It will be apparent that various other natural or synthesized particles may be used in place of the coke, clinker, ash or expandable shale so long as the essential characteristics of porosity, low specific gravity, incompressibility and chemical inertness are maintained. It will similarly be appreciated that different impregnated chemicals may be employed so long as they have the characteristic of expanding into a cohesive mass upon contact with the drilling fluid.

What is claimed is:

1. A composition for depositing in drilling fluid to prevent and counteract lost circulation through openings in well bore holes, comprising: coke particles characterized by uniformly irregular surfaces and porous textures, and a dehydrated substance of the montmorillonite clay group impregnated in the interstices of said porous particles.

2. A composition for depositing in drilling fluid to prevent and counteract lost circulation through openings in well bore holes, comprising: coke particles; and, one to fifty percent of dehydrated bentonite by weight of the weight of said coke particles impregnated in the interstices of said particles.

3. A composition, according to claim 3, in which said coke particles have an average diameter of one-eighth inch to one-half inch.

4. A method of forming a composition for depositing in drilling fluid to prevent and counteract lost circulation through openings in well bore holes, comprising the steps of: mixing with water porous coke particles characterized by uniformly irregular surfaces and porous textures and a substance of the montmorillonite clay group to form a paste in which said substance is retained in the interstices of said particles by incrustation of said substance on the exterior surfaces of the porous material; and, causing evaporation of the water in said paste, whereby a dry mixture is formed in which said substance is impregnated in the interstices of said porous particles.

5. A method according to claim 4, in which said substance is evaporated by heating said paste to a temperature greater than 212 degrees F.

6. A method, according to claim 4, in which said coke particles have an average diameter of one-eighth inch to one-half inch.

References Cited in the file of this patent

UNITED STATES PATENTS

| | | |
|---|---|---|
| 2,561,075 | Sidwell | July 17, 1951 |
| 2,648,522 | Armentrout | Aug. 11, 1953 |
| 2,650,195 | Cardwell et al. | Aug. 25, 1953 |
| 2,683,690 | Armentrout | July 13, 1954 |
| 2,728,733 | Hashimoto | Dec. 27, 1955 |